United States Patent
Dalmia

(10) Patent No.: US 10,892,880 B1
(45) Date of Patent: Jan. 12, 2021

(54) METHOD AND APPARATUS FOR ASYMMETRIC ETHERNET

(71) Applicant: Aquantia Corporation, San Jose, CA (US)

(72) Inventor: Kamal Dalmia, Fremont, CA (US)

(73) Assignee: Marvell Asia Pte., LTD, Singapore (SG)

( * ) Notice: Subject to any disclaimer, the term of this patent is extended or adjusted under 35 U.S.C. 154(b) by 73 days.

(21) Appl. No.: 15/228,161

(22) Filed: Aug. 4, 2016

Related U.S. Application Data

(63) Continuation of application No. 13/268,236, filed on Oct. 7, 2011, now abandoned.

(51) Int. Cl.
| | |
|---|---|
| H04L 5/14 | (2006.01) |
| G06F 1/3203 | (2019.01) |
| H04B 1/40 | (2015.01) |
| H04L 12/40 | (2006.01) |

(52) U.S. Cl.
CPC .............. *H04L 5/14* (2013.01); *G06F 1/3203* (2013.01); *H04B 1/40* (2013.01); *H04L 12/40039* (2013.01)

(58) Field of Classification Search
CPC ......... H04L 5/16; H04L 5/1423; H04L 12/12; H04L 12/1881; H04L 12/40039; H04L 5/14; G06F 1/3203; G06F 1/325; H04B 1/40

USPC ......... 370/201, 252, 296, 318; 713/320, 323
See application file for complete search history.

(56) References Cited

U.S. PATENT DOCUMENTS

| | | | | |
|---|---|---|---|---|
| 2009/0204836 | A1* | 8/2009 | Diab | H04L 12/12 713/323 |
| 2009/0282277 | A1* | 11/2009 | Sedarat | G06F 1/3209 713/320 |
| 2010/0115316 | A1* | 5/2010 | Diab | H04L 12/12 713/323 |
| 2011/0029796 | A1* | 2/2011 | Matthews | H04L 12/12 713/323 |
| 2012/0287829 | A1* | 11/2012 | Chang | H04L 5/16 370/296 |
| 2012/0320771 | A1* | 12/2012 | Chini | H04L 12/12 370/252 |

* cited by examiner

*Primary Examiner* — Harun Chowdhury

(57) ABSTRACT

In present embodiments, operation methods and apparatus for reducing power consumption in a 10GBASE-T transceiver circuit having transmit circuitry and receive circuitry for coupling to a plurality of physical channels are provided to transmit first data with the transmit circuitry in a first direction, receive second data with the receive circuitry in a second direction opposite to the first direction, identify an end-of-data indicator associated with the second data, and deactivate the receive circuitry in response to the end-of-data indicator. Preferably, in some embodiments, the receive circuitry is selectively switched off to reduce power consumption.

8 Claims, 6 Drawing Sheets

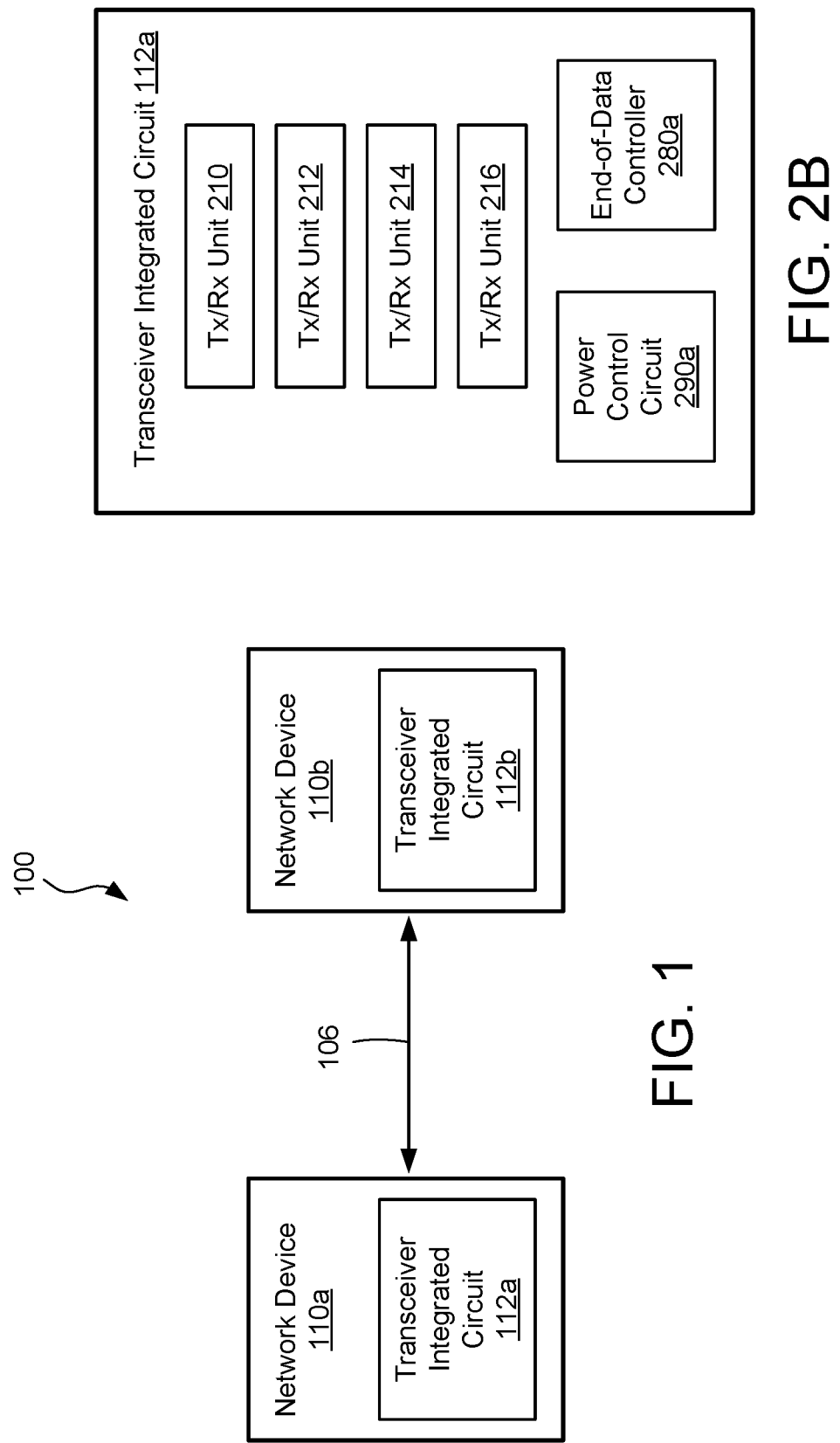

METHOD AND APPARATUS FOR ASYMMETRIC ETHERNET

CROSS-REFERENCE TO RELATED APPLICATIONS:

This application is a continuation of U.S. patent application Ser. No. 13/268,236, filed Oct. 7, 2011, titled METHOD AND APPARATUS FOR REDUCING POWER CONSUMPTION FOR DATA TRANSMISSION OVER ETHERNET, which is incorporated herein by reference in its entirety.

BACKGROUND

Technical Field:

The disclosure herein relates generally to electronic communications, and more particularly, to high speed Ethernet systems.

Description of Related Art:

A communication system permits communication between two or more network devices. Communication between network devices can be conventionally achieved using a communication line (or data link), formed by twisted pairs of wires (or cables), and transceivers, one transceiver positioned at each end of a twisted pair. For example, the IEEE 802.3an (10GBASE-T) standard targets data transmission rates with a total bandwidth of 10Gbit/s over four (4) pairs of twisted wires for distances of up to 100 meters. The data transmission is generally performed in a simultaneous bidirectional fashion, thus each pair of wires simultaneously carries bidirectional data, each direction running effectively at a data rate of 2.5 Gbit/s. Simultaneous bi-directional signaling is often referred to as "full duplex" signaling.

One problem associated with using multiple twisted pairs of wires and multiple transceivers at a full duplex capacity is power consumption. Due to the bidirectional nature of a 10GBASE-T system, the transceivers remain operational at full speed in both directions at all times as long as a data link is "alive." This can waste a large amount of power, since the transceivers consume energy at full capacity even when there is little or no data being transmitted over the data link.

It is known in the art to reduce transceivers' power consumption by switching the transceivers from an "active" mode into a "low power idle (LPI)" mode when no data is being sent. This technique is employed by a variant of the 10GBASE-T standard, known as Energy Efficient Ethernet (EEE), as described in the IEEE 802.3az standard. During the LPI mode, an LPI refresh signal is sent periodically to refresh the low power idle mode. The data link is considered "asleep," but still "alive" and not "dead" or "switched off," so that full speed data transmission can be resumed at a relatively short time (within milliseconds) as compared to reestablishing a data link, which can take up to several seconds.

BRIEF DESCRIPTION OF DRAWINGS

The accompanying drawings illustrate several embodiments of the disclosure and, together with the description, serve to explain the principles described herein. One skilled in the art will recognize that the particular embodiments illustrated in the drawings are merely exemplary, and are not intended to limit the scope of the disclosure.

FIG. 1 is a block diagram illustrating a communication system configured for reducing power consumption for data transmission, according to one embodiment.

FIG. 2B is a block diagram illustrating a transceiver integrated circuit, according to one embodiment.

DETAILED DESCRIPTION

Figure 2A:
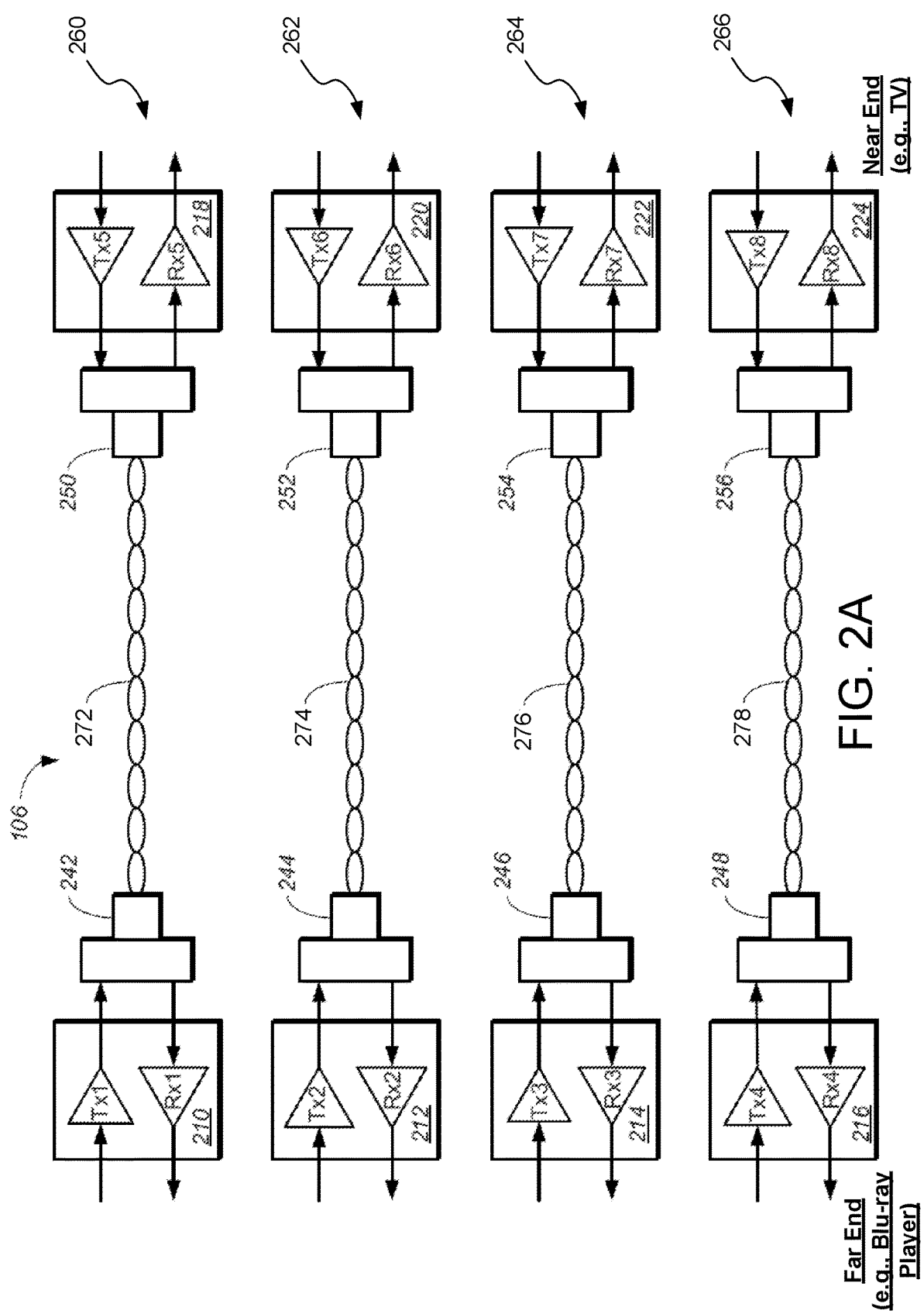
FIG. 2A is a schematic diagram illustrating one embodiment of the data link in the communication system of FIG. 1 in further detail, according to one embodiment.

In present embodiments, operation methods and apparatus for reducing power consumption in a 10GBASE-T transceiver circuit having transmit and receive circuitry for coupling to a plurality of physical channels are provided to transmit first data with the transmit circuitry in a first direction, receive second data with the receive circuitry in a second direction opposite to the first direction, identify an end-of-data indicator associated with the second data, and deactivate the receive circuitry according to the end-of-data indicator. Preferably, in some embodiments, the receive circuitry are selectively switched off to reduce power consumption. In accordance with one or more embodiments, a memory size of a memory device that the second data is fetched from can be discovered, and the end-of-data indicator can be determined based on the memory size.

FIG. 1 is a block diagram illustrating a communication system configured for reducing power consumption for data transmission, according to one embodiment. The communication system 100 includes network devices 110a and 110b. The network devices 110a and 110b are coupled in communication for data transmission over data link 106. For example, the components can be directly or indirectly connected via the Internet, a wide area network, a telephone network, any type of connection or connectionless network, and the like. One of ordinary skill in the art will understand that the components of FIG. 1 are just one implementation of the communication system within which present embodiments may be implemented, and the various alternative embodiments are within the scope and spirit of the disclosure herein. For example, there can be more than two network devices 110a,b, there can be more than one data link 106, and so forth.

The network devices 110a,b can be, for example, computers, switches, routers, hubs, gateways, and similar devices. In other embodiments, the network devices 110a,b can be, for example, a mobile device, a cell phone, a network-ready device, or any other device capable of connecting to a network. The network devices 110a,b transmit and receive data to and from each other through the data link 106. In accordance with present embodiments, one network device (e.g., 110a) can transmit data to the other network device (e.g., 110b) along the data link 106, and simultaneously receive data from the other network device (e.g., 110b) along the data link 106. One network device (e.g., 110a) can also identify an end-of-data indicator associated with the data transferred, and deactivate one or more transceiver portions associated with the transfer according to the endof-data indicator. In one or more embodiments, the deactivation of the one or more transceiver portions results in power saving for the network devices 110a,b.

The network devices ,b further comprise transceiver integrated circuits 112a,b, respectively. The transceiver integrated circuits 112a,b can be implemented, for example, on a line card plugged into a chassis within the network devices 112a,b, or on a mother board. In one embodiment, the transceiver integrated circuits 112a,b are implemented on separate substrates. The transceiver integrated circuits 112a,b can be implemented with hardware, software, and/or firmware. In one embodiment, the transceiver integrated circuits 112a,b can be implemented with a programmable array or an ASIC. The transceiver integrated circuits 112a,b can contain analog electronic components, digital electronic components, or a combination of both. The two transceiver integrated circuits 112a,b need not be implemented in the same manner for synchronized operation. The network devices 110a,b can also comprise other computing components such as a processor, memory, and a monitor.

In operation, the transceiver integrated circuits 112a,b provide a layer 1 Open Systems Interconnection (OSI) model functionality, such as sending and receiving signals between a media access control (MAC) device or other layer 2 device and the data link 106. In some embodiments, transceiver integrated circuits 112a,b are respectively a part a physical layer (PHY) device. In one embodiment, the transceiver integrated circuits 112a,b send and receive digital signals from the MAC device, while sending and receiving analog signals with the data link 106. The transceiver integrated circuits 112a,b can be integrated with the MAC device or other components, in some embodiments. The transceiver integrated circuits 112a,b can simultaneously transmit and receive data independently over the data link 106. In one embodiment, the transceiver integrated circuits 112a,b are able to detect an end-of-data indicator associated with the transferred data, and deactivate the transceivers associated with transferring the data based on the end-of-data indicator. An implementation of the transceiver integrated circuits 112a,b is described below in more detail.

FIG. 2A is a schematic diagram illustrating one embodiment of the data link 106 in the communication system of FIG. 1 in further detail, according to one embodiment. The communication data link 106 includes four twisted pairs of wires 272-278 that are connected to transceiver units 210-224 including transceivers Tx1/Rx1-Tx8/Rx8 through corresponding connectors 242-256. In one implementation of present embodiments, the transceivers are IEEE 10GBASE-T compliant. Each twisted pair of wires and their associated transceiver units form a physical channel. For example, twisted pair 272 and its associated transceiver units 210,218 form a physical channel 260, twisted pair 274 and its associated transceiver units 212,220 form a physical channel 262, and so forth. The twisted pairs 272-278 can be composed of copper, optical fiber, or any other suitable transmission medium. When operating at a bandwidth of 10 Gbit/s, each of the twisted pairs 272-278 operates at approximately 2.5 Gbit/s in each direction, demanding significant power from the transceivers Tx1/Rx1-Tx8/Rx8 and supporting circuitry.

For purposes of explanation, the data link 106 has two ends, a near end and a far end, though a person of ordinary skill in the art would understand that the two ends of the data link are generally identical and interchangeable. Also for illustration purposes, in one embodiment the far end interfaces with a media player device such as a Blu-ray player for providing a video streaming service, and the near end interfaces with a monitor device such as a television or other visual screen for receiving the video streaming service. However, it is noted a Blu-ray player need not be on the far end, and vice versa.

FIG. 2B is a block diagram illustrating a transceiver integrated circuit 112a that includes transceiver units on one end (e.g., the far end) of the data link of FIG. 2A, according to one embodiment. The transceiver integrated circuit 112a includes transceiver units 210-216 comprising a plurality of transceivers, an end-of-data controller 280a, and a power control circuit 290a. The end-of-data controller 280a is coupled to the transceiver units 210-216 to detect an end-of-data indicator from data transferred (e.g., received), and control the deactivation of transceiver units 210-216 according to the end-of-data indicator. In many embodiments, the end-of-data indicator can be determined by discovering a memory size for a memory device (not shown) from which the data is fetched. In accordance with present embodiments, the power control circuit 290a is coupled to the end-of-data controller 280a to selectively deactivate the transceiver units 210-216. In one embodiment, the end-of-data controller 280a can command the power control circuit 290a to deactivate suitable transceiver portions in the transceiver units 210-216 by switching off the transceiver portions associated with the transfer (e.g., receiving). In another embodiment, the end-of-data controller 280a can command the power control circuit 290a to deactivate suitable transceiver portions in the transceiver units 210-216 by operating the transceiver portions associated with the transfer (e.g., receiving) in a low power idle (LPI) mode or a low power communication (LPC) mode.

Figure 3:
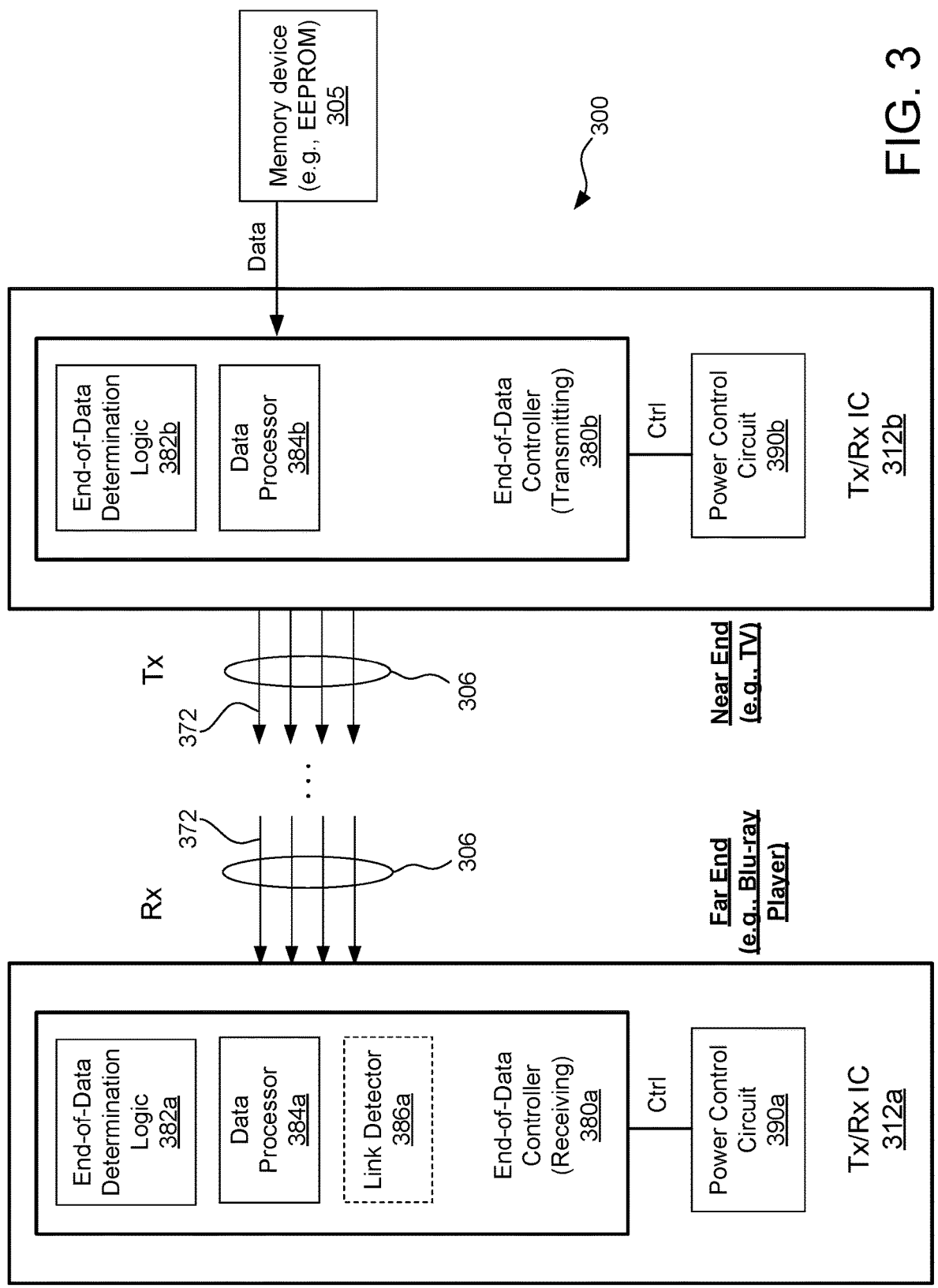
FIG. 3 is a block diagram illustrates an end-of-data controller configuration for data transmission in a communication system, according to one embodiment.

FIG. 3 is a block diagram illustrates an end-of-data controller configuration for data transmission in a communication system 300, according to one embodiment. The communication system 300 includes a data link 306 having a far end (e.g., interfaced to a Blu-ray player) and a near end (e.g., interfaced to a TV), a first transceiver integrated circuit 312a coupled to the far end of the data link 306, and a second transceiver integrated circuit 312b coupled to the near end of the data link 306. The communication system 300 further includes a memory device 305 coupled to the transceiver integrated circuit 312b for data transmission from the near end to the far end. For simplicity and a better understanding of present embodiments, in the following description regarding FIG. 3, only the data transmission from the near end (e.g., the TV) to the far end (e.g., the Blu-ray player) is explained. Nonetheless, a person of ordinary skill in the art would understand that a separate data transmission from the far end to the near end can operate independently.

The memory device 305 is a device that has a finite data storage, for example, an EEPROM, which is located on the near end (e.g., inside the TV). Typically, the memory device 305 stores data related to the hardware specification of the TV, for example, model name, serial number, supported resolution, screen size, etc. These pieces of information do not alter unless a different TV is connected to the Blu-ray player; therefore, during the entire video streaming session, these pieces of information only need to be transferred once to the Blu-ray player. More importantly, these pieces of information are data of a finite amount. Therefore, present embodiments can save power by identifying an end-of-data indicator associated with the data, and deactivating signal transceiver portions that are associated with transferring these pieces of data once the transfer is finished.

Now referring to the near end of the data link 306, the transceiver integrated circuit 312b includes an end-of-data controller 380*b* and a power control circuit 390*b*. The transceiver integrated circuit 312*b* further includes inputs to receive data from a MAC device or other layer 2 device (not shown), and is coupled to the data link 306 for data transmission. Specifically, the transceiver integrated circuit 312*b* receives data from a memory device 305 (e.g., an EEPROM) that is located on the near end (e.g., inside a TV). For purposes of explaining, the memory device 305 stores hardware specification information regarding the near end (e.g., the TV), and thus contains only a finite amount of data. Of course, other kinds of information may be stored in the memory device 305. For simplicity, the transceiver units as illustrated in FIG. 2B are not shown; however, it is to be understood that the physical channels (e.g., channel 372) in the data link 306 are each coupled to a respective transceiver unit for transmitting and receiving data.

The end-of-data controller 380*b* includes an end-of-data determination logic 382*b* and a data processor 384*b*. The data processor 384*b* is coupled to the data link 306 to identify an end-of-data indicator for the data received from the inputs of the transceiver integrated circuit 312*b*. The data processor 384*b* is also coupled to the end-of-data determination logic 382*b* to notify the end-of-data determination logic 382*b* if any end-of-data indicator is identified for the received data, and transfer information regarding the end-of-data indicator to the determination logic 382*b*.

The end-of-data determination logic 382*b* includes an input coupled to the data processor 384*b* to receive information regarding the end-of-data indicator, and an output coupled to the power control circuit 390*b* to deactivate transceiver portions. Based on the information, the determination logic 382*b* can deactivate one or more transceiver portions associated with the transmitting according to the information regarding the end-of-data indicator. If the information indicates that no end-of-data indicator is identified, meaning there can be more data to be received from the memory device 305, then the determination logic 382*b* keeps the transceivers in an active mode to transmit data. If the information indicates that the end-of-data indicator is identified, meaning there is no more data to be transmitted through the data link 306, then the determination logic 382*a* sends out control signals to command the power control circuit 390*a* to switch off or reduce the power consumption of suitable transceiver portions associated with transmitting. In this way, when data transmission ends, transceiver power consumption drops to a minimal level.

The power control circuit 390*b* includes a control port to receive control signals from the end-of-data determination logic 382*b* to deactivate one or more transceiver portions. In one embodiment, the power control circuit 390*b* deactivates the transceiver portions by switching off the transceiver power supplies. In other embodiments, the power control circuit 390*b* deactivates the transceiver portions by operating the transceiver portions in a low power idle (LPI) mode, as provided by the IEEE 802.3az standard.

Further, it is noted that these low power or switched off modes are just exemplary modes that the power control circuit 390*b* can employ in reducing the power consumption of the transceiver portions upon the command of the end-of-data determination logic 382*b*. It is therefore understood that, in some other embodiments, the power control circuit 390*b* can reduce the power consumption of the transceiver portions by operating the transceiver portions in other modes, including those not currently specified by the IEEE 802.3 Ethernet standards. For example, in one embodiment, the power control circuit 390*b* can operate the transceiver portions in a low power communication (LPC) mode, which provides methods for transferring data with low power consumption using a refresh signal structure similar to LPI refresh signals.

Now referring to the far end of the data link 306, the transceiver integrated circuit 312*a* includes an end-of-data controller 380*a* and a power control circuit 390*a*. The transceiver integrated circuit 312*a* further includes inputs to receive data from a MAC device or other layer 2 device (not shown), and is coupled to the data link 306 for data transmission. For simplicity, the transceiver units as illustrated in FIG. 2B are not shown in FIG. 3; however, it is to be understood that the physical channels (e.g., channel 372) in the data link 306 are each coupled to a respective transceiver unit for transmitting and receiving data.

The end-of-data controller 380*a* includes an end-of-data determination logic 382*a*, a data processor 384*a*, and optionally, a link detector 386*a*. The data processor 384*a* is coupled to the data link 306 to identify an end-of-data indicator associated with the data received from the inputs of the transceiver integrated circuit 312*a*. The data processor 384*a* is also coupled to the end-of-data determination logic 382*a* to notify the end-of-data determination logic 382*a* if any end-of-data indicator is identified for the received data, and transfer information regarding the end-of-data indicator to the determination logic 382*a*.

The end-of-data determination logic 382*a* includes an input coupled to the data processor 384*a* to receive information regarding the end-of-data indicator, and an output coupled to the power control circuit 390*a* to deactivate transceiver portions. Based on the information, the determination logic 382*a* can selectively deactivate one or more transceiver portions associated with the receiving according to the information regarding the end-of-data indicator. If the information indicates that no end-of-data indicator is identified, meaning there can be more data to be received through the data link 306, then the determination logic 382*a* keeps the transceivers in an active mode to receive data. If the information indicates that the end-of-data indicator is identified, meaning there is no more data to be received through the data link 306, then the determination logic 382*a* sends out control signals to command the power control circuit 390*a* to switch off or reduce the power consumption of suitable transceiver portions associated with receiving. In this way, when data transmission ends, transceiver power consumption drops to a minimal level.

The power control circuit 390*a* includes a control port to receive control signals from the end-of-data determination logic 382*a* to deactivate one or more transceiver portions. In one embodiment, the power control circuit 390*a* deactivates the transceiver portions by switching off transceiver power supplies. In other embodiments, the power control circuit 390*a* deactivates the transceiver portions by operating the transceiver portions in a low power idle (LPI) mode, as provided by the IEEE 802.3az standard.

Further, it is noted that these low power or switched off modes are just exemplary modes that the power control circuit 390*a* can employ in reducing the power consumption of the transceiver portions upon the command of the end-of-data determination logic 382*a*. It is therefore understood that, in some other embodiments, the power control circuit 390*a* can reduce the power consumption of the transceiver portions by operating the transceiver portions in other modes, including those not currently specified by the IEEE 802.3 Ethernet standards. For example, in one embodiment, the power control circuit 390*a* can operate the transceiver portions in a low power communication (LPC) mode, which provides methods for transferring data with low power consumption using a refresh signal structure similar to LPI refresh signals.

Because in some embodiments, the receiving portion of the transceivers on the far end is completely switched off, the link status cannot be determined from the receipt of data. Therefore, in such embodiments, the link detector 386a is coupled to the data link 306 to detect a disconnection of the physical channels (e.g., channel 372). If the data link 306 is disconnected, then the link detector 386a can notify the transceiver integrated circuit 312a to respond accordingly, for example, to stop transmitting data to the near end, or to prepare for reestablishing a new connection. In some embodiments, the link detector 386a monitors an echo of the data being transmitting on the data link 306 to detect whether the physical channels are disconnected. Of course, other methods of detecting a disconnection of the physical channels can be employed to facilitate the detection of the status of the physical channels.

Detailed operation of the communication system 300 is now described, according to present embodiments. For simplicity, only the operation that is related to transmission of the finite data is illustrated in and described with FIG. 3 (from the near end to the far end), as the operation of the other portion (from the far end to the near end) is the same with a typical 10GBASE-T communication system. It should also be understood that the transmitting portion and the receiving portion on the transceiver integrated circuits 312a,b function independently, so one portion may operate in a way that is independent of the other portion.

When transferring the data, one or more controllers (e.g., 380a,b) on the transceiver integrated circuits 312a,b can identify an end-of-data indicator associated with the transferred data, and selectively deactivate one or more transceiver portions associated with transferring the data according to the end-of-data indicator. According to one or more embodiments, one or more power control circuits (e.g., 390a,b) are coupled to the controllers to selectively switch off the transceiver portions that are associated with the transfer. According to other embodiments, one or more power control circuits (e.g., 390a,b) are coupled to the controllers to selectively operate the transceiver portions in an LPI mode or an LPC mode. In some embodiments, one or more detectors are coupled to the data link 306 to detect a disconnection of the physical channels (e.g., channel 372).

Figure 4:
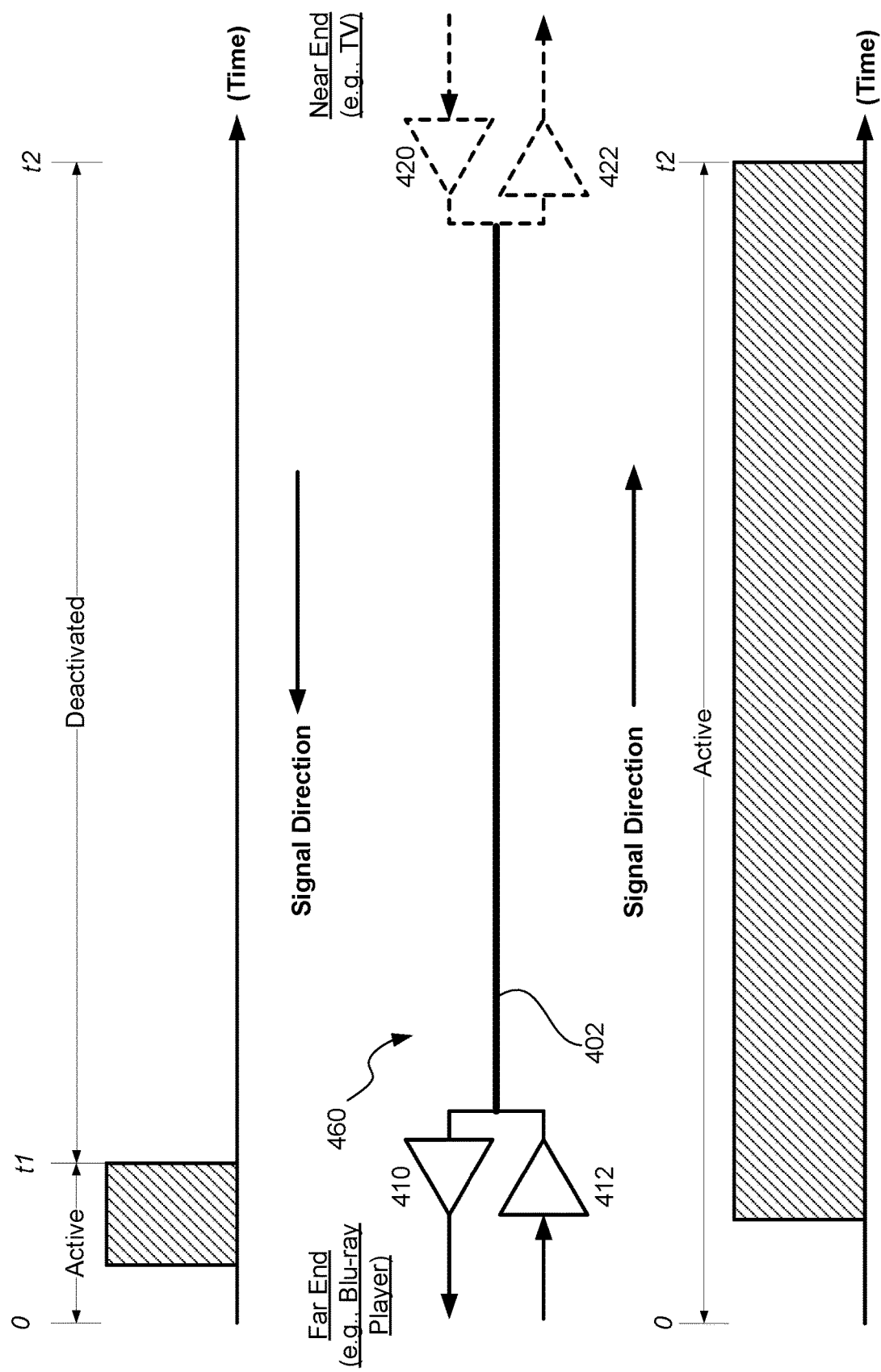
FIG. 4 is a diagram illustrating an embodiment performing an exemplary signal transmission over a physical channel.

FIG. 4 is a diagram illustrating an embodiment performing an exemplary signal transmission over a physical channel 460 corresponding to the physical channels 272, 274, 276, and 278. In one embodiment, the physical channel 460 includes a twisted pair of wires 402 having a far end (e.g., Blu-ray player) and a near end (e.g., TV). The far end includes a far end receiver 410 and a far end transmitter 412, which together form a far end transceiver. Similarly, the near end includes a near end transmitter 420 and a near end receiver 422, which together form a near end transceiver. It is noted that, in the following description regarding FIG. 4, present embodiments are explained from the far end's perspective. Therefore, the near end transceiver is shown in dotted lines.

As shown in FIG. 4, a large amount of data is transmitted from the far end (e.g., Blu-ray player) to the near end (e.g., TV) during time 0 to t2. On the contrary, only a small amount of data is received from the near end (e.g., TV) to the far end (e.g., Blu-ray player) during the same period. More specifically, there is no more data to be received by the far end after time t1. According to present embodiments, the far end transmitter 412 and the near end receiver 422 can each operate in the active mode at all times (from time 0 to time t2) for the Blu-ray player to transmit data to the TV. The far end receiver 410 and the near end transmitter 420 can both be switched off during the period between t1 and t2. Alternatively, the far end receiver 410 and the near end transmitter 420 can both operate in a low power idle (LPI) mode or a low power communication (LPC) mode. Therefore, in this period between t1 and t2, power consumption of the receiver 410 and the transmitter 420 in the present embodiments can be reduced.

Figure 5:
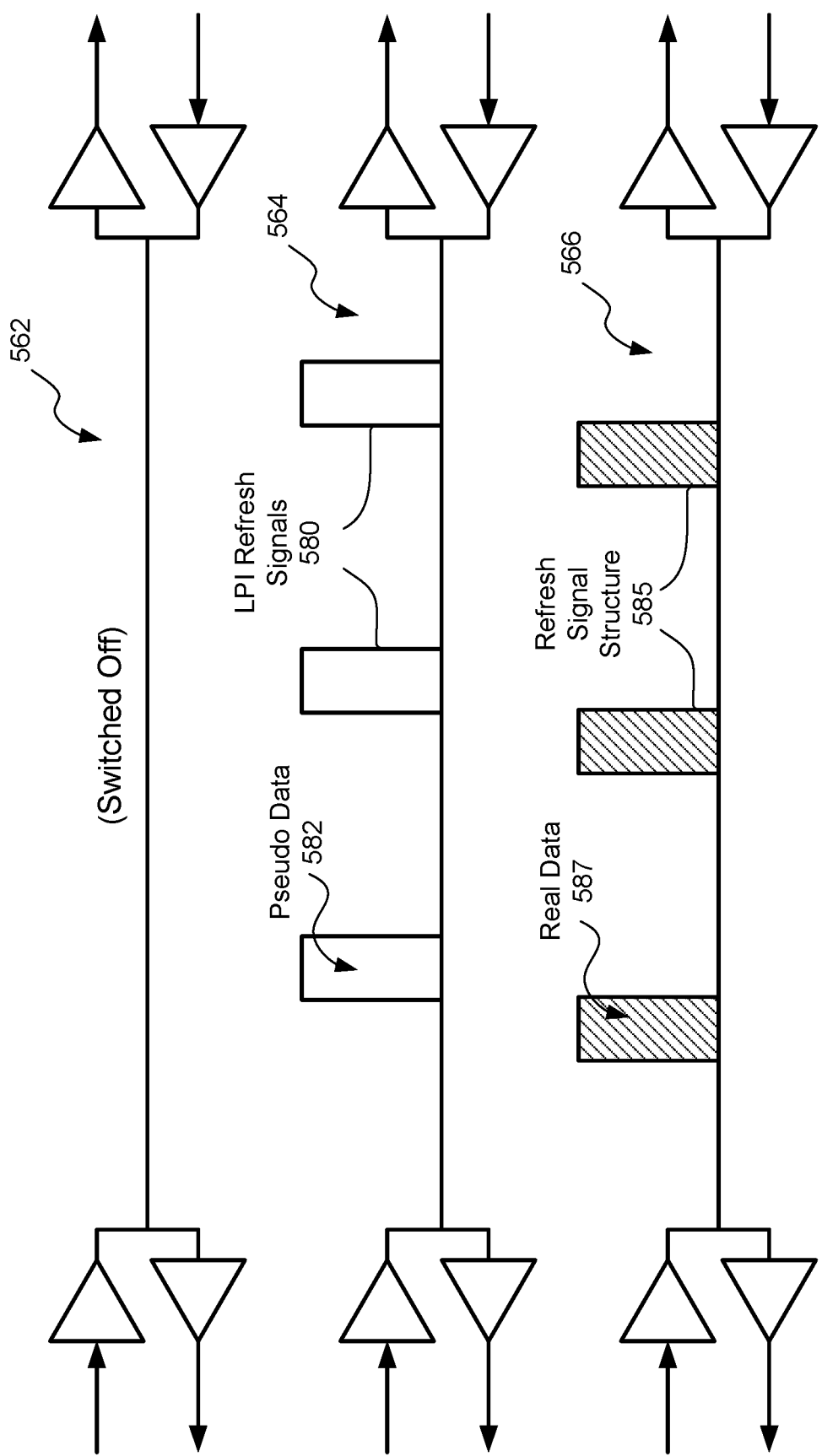
FIG. 5 is a diagram illustrating different modes for deactivating transceivers to reduce power consumption, according to some embodiments.

FIG. 5 is a diagram illustrating different modes for deactivating transceiver portions to reduce power consumption, according to some embodiments. In FIG. 5, three physical channels 562, 564 and 566 are shown with each associated with a pair of transceivers on each end of the physical channels. For simplicity, only signal transmission of one direction that is associated with finite data transmission is shown in FIG. 5. In present embodiments, the transceiver portions associated with the data transmission can be deactivated by their respective end-of-data controllers after end-of-data indicators are identified. Depending on the embodiments, there can be several possible modes for deactivating transceiver portions to achieve power savings. For one embodiment, as illustrated on the physical channel 562, after finishing the transmission of the data, transceiver portions associated with the data transmission on the physical channel 562 are switched off. For another embodiment, as illustrated on the physical channel 564, after finishing the transmission of the data, transceiver portions associated with the data transmission on the physical channel 564 operate in an LPI mode, transferring LPI refresh signals 580 on the physical channels 564 to keep the link "alive" while consuming very little energy.

In yet another embodiment, as illustrated on the physical channel 566, after finishing the transmission of the data, transceiver portions associated with the data transmission on the physical channel 566 operate in an LPC mode similar to the LPI mode. More specifically, in the current EEE standard, a sequence of scrambled one hundred and twenty eight (128) zeros are inserted in each LPI refresh signal 580 as pseudo data 582. Present embodiments may replace this pseudo data 582 with real data 587, and encode the real data 587 into a refresh signal structure 585. In this manner, the physical channel 566 is able to transmit data at a slower speed, with a reduced power consumption level similar to the LPI mode.

Again as described above, the transmitting and receiving are independent to each other in a communication system such as 10GBASE-T. Therefore, the communication system such as illustrated in FIG. 5 can save power by deactivating transceiver portions associated in transferring data in one direction after the data is transferred.

Figure 6:
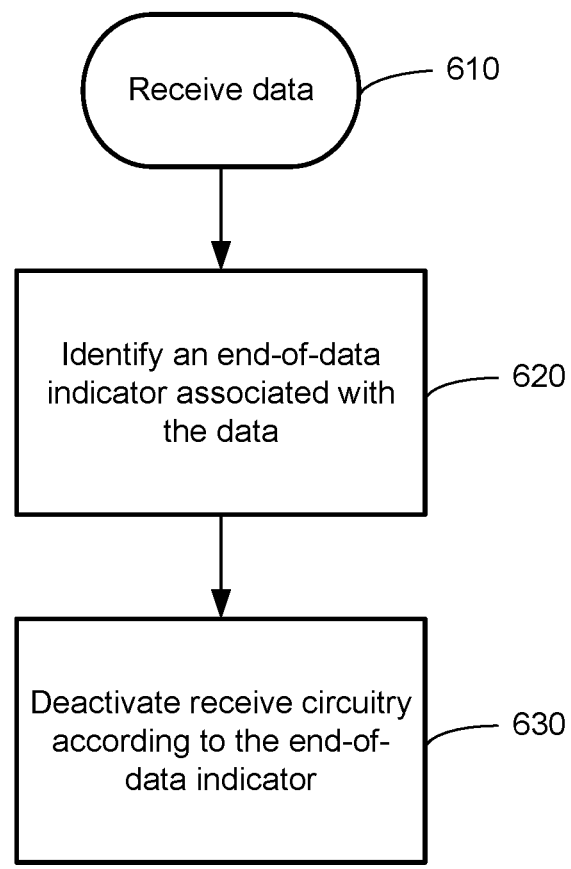
FIG. 6 is a flow chart illustrating a method for reducing power consumption for data transmission, according to one embodiment.

FIG. 6 is a flow chart illustrating a method for reducing power consumption for data transmission, according to one embodiment. With reference back to FIG. 3, an exemplary method for reducing power consumption for data transmission using an end-of-data controller (e.g., controller 380a) is now described.

First, the end-of-data controller 380a receives data (610). Then, the end-of-data determination logic 382a identifies an end-of-data indicator associated with the data (620). If the end-of-data indicator is not identified, meaning there can be more data to be received from the memory device 305, then the determination logic 382a keeps the transceivers in an active mode to receive data. If the end-of-data indicator is identified, meaning there is no more data to be received through the data link 306, then the determination logic 382a deactivates the receive circuitry of the transceivers according to the end-of-data indicator (630).

Advantageously, a communication system employing present embodiments can save power by reducing power consumption for finite data transmission. Pursuant to present embodiments, the power consumption associated with transferring a limited amount of data can be reduced, because the system need not operate the transceivers in active mode after the transfer of such data is finished. More specifically, after the transmission of the data, the transceiver portions associated with such transfer are switched off or their power is reduced. In this manner, unnecessary power consumption associated with operating the transceivers at full speed while not transferring any data is saved. Therefore, present embodiments can achieve great power saving in many applications, and in particular, video streaming through HDMI from a Blu-ray player to a TV.

While particular embodiments have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure.

Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

What is claimed is:

1. A transceiver integrated circuit (IC) of a BASE-T Ethernet communication system, comprising:
   a plurality of BASE-T Ethernet transceivers having multiple transmit circuits and multiple receive circuits for coupling to corresponding multiple twisted-pair copper channels;
   wherein a first group of one or more of the transmit circuits collectively transmits a first amount of data during a first time interval;
   wherein a second group of one or more of the receiver circuits collectively receives a second amount of data that is different from the first amount of data during the first time interval;
   wherein after transmitting the first amount of data, the first group of one or more of the transmit circuits is configured,
      in a low-power mode, transmit refresh signals during a refresh period of a first time interval, ones of the refresh signals including real data encoded into a sequence of 128 bit values.

2. The transceiver integrated circuit (IC) of claim 1, wherein the first group of the one or more transmit circuits comprises a first number of transmit circuits and the second group of the one or more receiver circuits comprises a second number of receiver circuits that is different than the first number of transmit circuits.

3. The transceiver integrated circuit (IC) of claim 1, wherein the real data comprises data other than scrambled bit values inserted into the sequence as pseudo data.

4. A transceiver integrated circuit of a BASE-T communication system, comprising:
   a plurality of BASE-T Ethernet transceivers having multiple transmit circuits and multiple receive circuits for coupling to corresponding multiple twisted-pair copper channels;
   wherein a first group of one or more of the transmit circuits collectively transmits data at a first data rate;
   wherein after transmitting data at the first data rate, the first group of transmit circuits operate in a low power communication (LPC) mode; and
   wherein the first group of transmit circuits transmit, at a second data rate lower than the first data rate, refresh signals during a refresh period while operating in the LPC mode, ones of the refresh signals including real data encoded into a sequence of 128 bit values.

5. The transceiver integrated circuit of a BASE-T communication system of claim 4, wherein the real data comprises data other than the scrambled bit values inserted into the sequence as pseudo data.

6. A 10GBASE-T communication system, the system comprising:
   multiple twisted-pair copper channels having a first end and a second end;
   a plurality of BASE-T Ethernet transceivers having multiple transmit circuits and multiple receive circuits coupled to corresponding first ends of the multiple twisted-pair copper channels;
   wherein a first group of one or more of the transmit circuits collectively transmits a first amount of data during a first time interval; and
   wherein a second group of one or more of the receiver circuits collectively receives a second amount of data that is different from the first amount of data during the first time interval;
   after transmitting the first amount of data, the first group of transmit circuits is configured,
   in a low-power mode, to transmit refresh signals during a refresh period of a first time interval, ones of the refresh signals including real data encoded into a sequence of 128 bit values.

7. The communication system of claim 6, wherein the first group of the one or more transmit circuits comprises a first number of transmit circuits and the second group of the one or more receiver circuits comprises a second number of receiver circuits that is different than the first number of transmit circuits.

8. The 10GBASE-T communication system of claim 6, wherein the real data comprises data other than scramble bit values into the sequence as pseudo data.

* * * * *